United States Patent [19]
Cheseldine

[11] 4,164,005
[45] Aug. 7, 1979

[54] SOLID ELECTROLYTE CAPACITOR, SOLDERABLE TERMINATIONS THEREFOR AND METHOD FOR MAKING

[75] Inventor: David M. Cheseldine, Bennington, Vt.

[73] Assignee: Sprague Electric Company, North Adams, Mass.

[21] Appl. No.: 830,310

[22] Filed: Sep. 2, 1977

[51] Int. Cl.² .......................... H01G 9/00; B01J 17/00
[52] U.S. Cl. ....................................... 361/433; 29/570; 361/271; 361/272; 174/52 PE; 357/72
[58] Field of Search ............... 361/433, 271, 272, 278; 29/570; 357/72; 174/52 PE

[56] References Cited
U.S. PATENT DOCUMENTS

| | | | |
|---|---|---|---|
| 3,333,164 | 7/1967 | Garand et al. | 361/433 |
| 3,579,813 | 5/1971 | Tomiwa | 29/570 |
| 3,950,842 | 4/1976 | Fournier et al. | 361/433 |
| 4,017,773 | 4/1977 | Cheseldine | 361/433 |

FOREIGN PATENT DOCUMENTS 1293333  1/1970  United Kingdom ............... 361/433

Primary Examiner—Andrew J. James
Attorney, Agent, or Firm—Connolly and Hutz

[57] ABSTRACT

A highly solderable tightly bonded termination is provided on the exterior cathode and/or anode surfaces of a solid electrolyte capacitor. A conductive resin is applied to a surface of the capacitor body to be terminated. Deposited on this wet surrface are solderable metal particles, such as copper, prior to heat curing the resin. Solderable anode and cathode terminations may be provided by this method.

27 Claims, 3 Drawing Figures

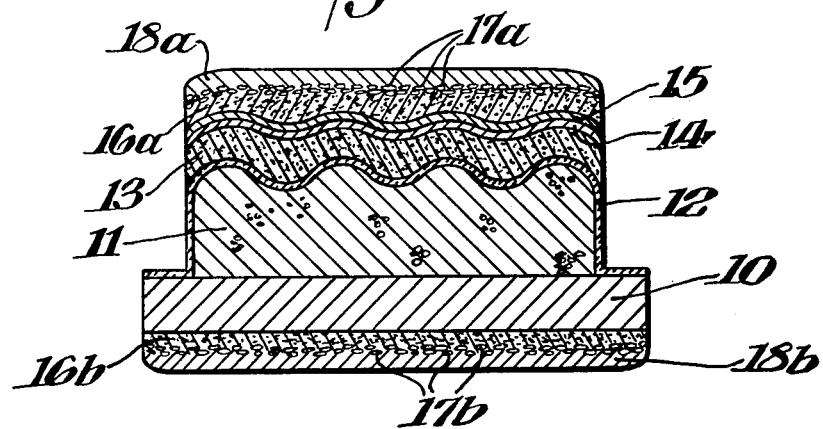
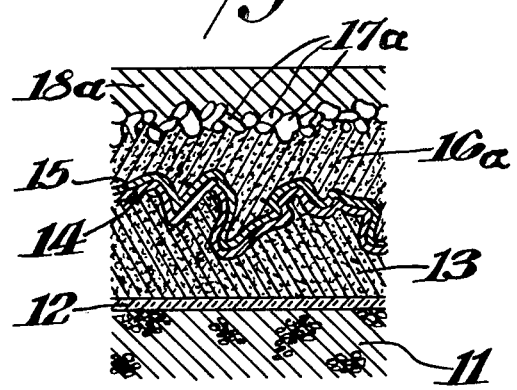
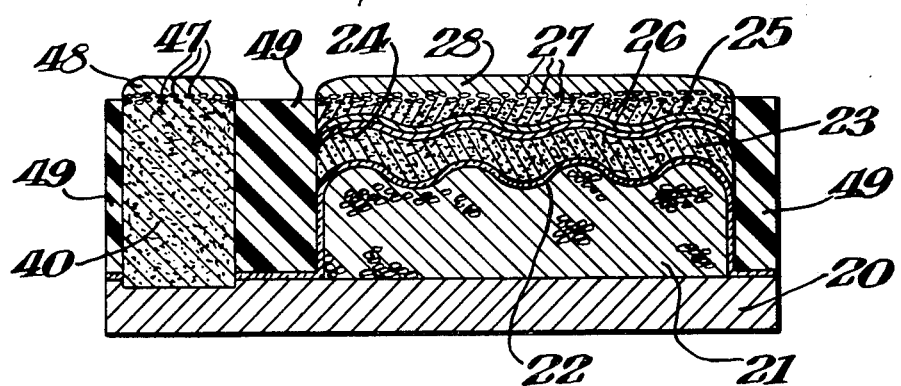

SOLID ELECTROLYTE CAPACITOR, SOLDERABLE TERMINATIONS THEREFOR AND METHOD FOR MAKING

BACKGROUND OF THE INVENTION

This invention relates to solderable terminations in solid electrolyte capacitors.

Numerous termination systems are known wherein a cured resin having a matrix of metal particles included therein overlies an electrical contact surface region of an electrical component. For example, in my patent U.S. Pat. No. 4,017,773 issued Apr. 12, 1977, a silver loaded silicone resin is deposited over the graphite covered body of a solid electrolyte tantalum capacitor, to form an electrical and a mechanical connection between this body surface and a cathode lead wire. Also in the patent to Millard et al, U.S. Pat. No. 3,889,357 issued June 17, 1975, there is described a screen printed solid electrolyte capacitor wherein silver particles held in an acrylic binder overlie the graphite coated solid electrolyte to impart solderability to it. Further, in a patent application to Thompson et al, Ser. No. 666,767 filed Mar. 15, 1976, the end cap terminals for a solid electrolyte capacitor include a silver or copper loaded resin that may have an outer coating of silver or other metal that improves solderability. The solderable outer coating may be applied by plating or by using a silver paste that is subsequently cured. The above mentioned patents and patent application are assigned to the same assignee as the present invention.

Yet another known termination system has a thin-walled copper coating over the carbon layer of a solid electrolyte capacitor, which coating is deposited by an arc spray technique that at least partially melts the copper particles to effect a bond between each other and to the underlying conductive body surface.

The above noted termination systems suffer from certain disadvantages. For example, those which give the strongest adhesion and therefore most reliable contact are not readily solderable i.e. conductive epoxies and other systems where conductive particles are dispersed in a carrier resin. Other termination systems in which metal is exposed by solvent evaporation or in which metal is applied directly by flame spray have in general, a much weaker bond which may be further weakened during solder application by leaching and differential expansions. While copper and nickel are less susceptible to solder leaching than silver, the processes such as plating and metal spraying by which such metals have been conventionally applied tend to require special precautions against chemical contamination of the component body by plating baths, and in general close process controls leading to relatively complex and expensive manufacturing procedures.

The foregoing discussion is particularly relevant to the cathodic termination of a solid electrolytic capacitor where certain unique problems exist. Namely, the surface to be contacted is a graphite covered solid electrolyte such as manganese dioxide. This surface may be relatively small as for example in the type of capacitor described in U.S. Pat. No. 3,889,357 where only one surface of the capacitor may be conveniently contacted. In such a capacitor it is critically important that a strong bond be established between the body of the capacitor and the solder contact because unlike the three dimensional cathode surface of a standard rectangular or cylindrical body having an anode lead wire extending therefrom, the cathode termination of the screened pad capacitor cannot encompass and grip the body.

It is also desirable in some constructions to provide a solderable coating to the tantalum substrate surface opposite to that having a screen printed porous anode formed thereon, to provide a solderable anode termination.

An object of this invention is to provide a high bond strength conductive resin for the termination of a solid electrolyte capacitor and rendering the surface of such resin highly solderable.

A further object of this invention is to provide a relatively low cost solderable and reliable termination system for a solid electrolyte capacitor.

SUMMARY OF THE INVENTION

A termination system for a solid electrolyte capacitor, which component is comprised of a solid electrolyte capacitor body having at least one electrical contact region on a surface thereof; an organic resin layer that is rendered conductive by having a matrix of conductive particles dispersed therein, the resin layer overlying the contact region; and a layer consisting of distinct solderable metal particles which is directly bound by and only partially embedded in the outer surface of the resin layer. An outer solder layer may be solder bonded to the metal particles.

The above described terminations are produced by applying a layer of a liquid resin to the above noted contact region of the component body, which liquid resin is loaded with a conducting powder; depositing solderable metal particles onto the wet outer surface of the loaded liquid resin; removing excess metal particles and curing the resin. The resulting thickness of the metal particle layer is from 1 to 10 times the mean diameter of the metal particles. It has been found that the layer of partially embedded metal particles is usually thicker than the average metal particle diameter, probably because the wet resin either creeps up over a portion of the first embedded particles to effect a bond to subsequently applied metal particles or because of resin splashing or both. Any surplus metal particles i.e. those not adhered to the resin, may then be removed by brushing, shaking or blowing them away.

A rough outer solid electrolyte surface is particularly well suited as a foundation for a conductive resin type of termination since the resin hardens around the uneven contours of the surface, keying to it even when weakly bonded conformal layers such as graphite and solvent based conductive paints are interposed between the solid electrolyte surface and the conductive resin.

The solderable metal particles may have a wide variety of sizes and shapes. As the average particle size becomes larger the final surface may be too roughly contoured to permit the desired dimensional control, and this may result in an upper practical limit to particle size. As the metal particles become very small, soldering becomes more difficult probably on account of the higher concentration of oxide on the surface. However, with suitable fluxes fine powders may be used. The most desirable metal powders for use with this invention have average particle diameters within the range of about 0.0005 to 0.010 inch.

The metal particles may be of any solderable metal or mixtures of such metals but will preferably be of those metals which are of low cost and are relatively easy to solder such as copper, tin, lead, nickel, silver, and alloys thereof.

The dry solderable metal particles may be applied to the surface of the conductive resin, before it is fully cured, in a variety of ways. Methods of application include sifting, pouring or spraying the dry metal particles onto the tacky surface of the component. Alternatively, the component still having a tacky surface may be passed through a fluidized bed of the dry metal powder.

The resin, in which the solderable conducting particles have been embedded in the outer surface thereof, is then cured. A suitable flux may be applied to the shallow particle layer over which a layer of solder may be subsequently applied.

BRIEF DESCRIPTION OF THE DRAWING

FIG. 1 shows in side cross-sectional view, a screen printed solid electrolyte capacitor having a termination system of this invention.

FIG. 2 represents a magnified detail of the cathode termination region of the capacitor of FIG. 1.

FIG. 3 shows in side sectional view another screen printed capacitor having a termination system according to this invention.

DESCRIPTION OF THE PREFERRED EMBODIMENTS

A first preferred embodiment of this invention is illustrated in FIGS. 1 and 2. A tantalum sheet 10 of about 0.005 inch in thickness, carries a porous pad 11 of tantalum particles that are sinter bonded to each other and to the sheet 10. The undulations in the upper surface of pad 11 are the result of having deposted the tantalum particles by a screening method as is described in detail in the above noted U.S. Pat. No. 3,889,357 which is incorporated by reference herein. A film 12 of tantalum oxide is formed electrolytically on the surfaces of the tantalum, which oxide film serves as dielectric of the capacitor. A layer of manganese dioxide 13 is pyrolytically deposited over the oxide film, preferably by the steps of selectively applying successive coatings of manganous nitrate only over the oxidized surface of the pad 11 and heating after each application to pyrolytically convert the $MnNO_3$ to $MnO_2$ which serves as a solid semiconducting electrolyte. Conformal layers of graphite 14 and silver paint 15 are also applied over the $MnO_2$ layer. The layer of silver paint 15 is a solvent based conductive silver containing particles of silver flake and a resin binder, namely Dupont paint #4817. The paint is cured by heating.

The cathode termination system of the capacitor would normally be completed by applying solder directly to the cured silver layer 15. However, this has the two drawbacks mentioned earlier whereby the silver tends to be leached away in hot molten solder and the final solder-silver-graphite system does not exhibit as strong a bond to the underlying $MnO_2$ layer as desired especially in the screen printed capacitor structure wherein the termination to $MnO_2$ interface is flat or essentially two dimensional.

A layer 16a of conductive resin is next applied over the silver layer 15, which resin contains copper powder and is manufactured under the Trade Mark, CONDUCT, by Electro-Kinetic Systems of Chester, Pa. The conductive resin can be applied in a variety of ways which include dipping, brushing, rolling and screen printing. The thickness of this layer is about 0.005 inch but is not critical. Immediately after applying the resin, dry copper particles 17a are sifted onto the wet resin coated surface. The copper will also cover adjacent areas not covered by resin but will not adhere to these areas and can easily be shaken, brushed or blown off by directing a blast of air at the particles. The conductive resin is then cured by heating for 45 minutes at 125° C. securely bonding the partially embedded copper particles and presenting a broad bare copper surface area which is readily solderable. A layer of solder 18a may then be applied by fluxing and solder dipping or wave soldering.

In the magnified detail of FIG. 2, the surface roughness of the $MnO_2$ layer 13 is shown to be very great. Such a large surface roughness may be approximated by heating and pyrolyzing the last coat or coats of manganous nitrate in steam at from 200°–400° C. However, it is preferred to employ the gentler and more effective method described by Fournier in U.S. Pat. No. 3,950,842, issued Apr. 20, 1976 and assigned to the same assignee. The method of this patent, which is incorporated by reference herein, includes applying a last coating of manganous nitrate, that is rendered thixotropic by having submicron $MnO_2$ particles dispersed therein, immersing in a fluidized bed of $MnO_2$ particles of about 30–100 microns diameter, and pyrolyzing.

The subsequent application of aquadag silver paint results in thin layers of graphite 14 and silver 15, respectively, that are conformal to the rough outer surface of the $MnO_2$ layer 13. The conductive resin 16 not only adheres well to the silver 15, but it keys and locks to the rough silver coated $MnO_2$ layer, as illustrated in FIG. 2, to provide a very strong physical bond between the resin and the $MnO_2$ layer. Of course, solder would also lock to and adhere to the silver coated $MnO_2$ layer, but solder is softer providing a weaker bond. More significantly the direct solder coating of the silver coated $MnO_2$ layer progressively loses adherence and electrical contact every time the solder is reflowed as in attaching leads, as in direct bonding to a substrate, or for repair of adjacent parts. This degradation is due to molten solder leaching of the silver from layer 15. The degree of silver leaching is a function of temperature and accumulated time during which the solder is molten and can easily lead to the complete dissolution of the silver layer 15.

The tantalum sheet 10 and porous tantalum pad 11 serve as the anode of the capacitor. To render the bottom surface (as shown) of the tantalum sheet solderable, this surface is sand blasted to remove any oxides and a layer 16b of the conductive resin, described above for forming cathodic layer 16a, is applied. A layer of copper particles 17b is then deposited and partially embedded in the wet resin surface and the resin subsequently cured. A solder coat 18b may then be applied over the copper. These steps for forming anode termination layers 16b, 17b and 18b may be carried out essentially simultaneously with the corresponding steps described earlier for forming the cathode termination layers 16a, 17a and 18a. Furthermore, when a plurality of capacitors, as that illustrated in FIG. 1, are initially formed on a common tantalum sheet 10, the termination layers of the anodes and/or the cathodes may be simultaneously formed prior to severing the sheet to separate the discrete capacitors.

A second preferred embodiment is illustrated in FIG. 3 wherein a screened solid electrolyte capacitor is formed on a tantalum sheet 20 by the same steps as those described for the capacitor of FIG. 1. Corresponding elements of this capacitor are designated by numerals that are derived by adding 10 to those of the counterpart elements of FIG. 1.

The capacitor of FIG. 3 provides solderable anode and cathode terminations that both lie in essentially the same plane to permit "face bonding" of the capacitor to correspondingly spaced conductive contacts of a printed circuit board or the like.

This is accomplished by constructing a conductive tower or bar 40 that contacts the upper face of an extended region of tantalum anode sheet 20. The tower 40 has an elevation above the sheet 20 as shown that essentially equals that of the conductive resin layer 26, and is spaced from the pad 21 with oxide layer 22 and cathodic layers 23 through 28.

The tower 40 is formed by casting a conductive resin. Copper particles 47 are sifted onto the top of the uncured or partially cured tower of resin and the resin is subsequently fully cured. A solder layer 48 may be applied to the copper layer 47. These last two steps may conveniently be performed simultaneously with corresponding steps for forming layers 27 and 28.

This anode termination structure is most conveniently carried out simultaneously for a plurality of capacitors that are formed on a common anode sheet 20, whereby the "streets" separating the rows and columns of capacitor pads e.g. pad 21 having layers 22 through 26 formed thereon are flooded with an insulating resin 49. After curing the insulative resin 49, slots more narrow than the "streets" are cut or milled in the insulative resin about in the center of the "streets" leaving slots in the resin down to and even partially into the supporting tantalum sheet 20 (as illustrated). By damming the ends of the milled slots, a cavity is formed into which the conductive resin 49 may be poured and cast. The resin employed for the tower is a silver loaded epoxy resin ECR 4200 supplied by Formulated Resins, Inc., of Greenville, R.I. This resin is a relatively inexpensive silver epoxy which is more suitable than the copper loaded epoxy for building up thick sections.

Alternatively, a solderable metal bar or strip, such as nickel, (not shown) may be welded to the tantalum sheet to form the anode contact, in place of conductive epoxy tower 40.

Although the use of the strongly adhered terminations of this invention are particularly desirable in planar screen-printed capacitors as illustrated and described above, they are also useful for terminating other solid electrolyte valve-metal capacitors. For example, the cylindrical (or right parallelepiped) cathode counterelectrode of the common molded pellet type capacitor, wherein the counterelectrode encompasses the pellet, may advantageously be terminated by the novel means described herein to avoid the silver leaching problem and to further enhance the physical strength of the counterelectrode-terminal system.

What is claimed is:

1. A termination system for a solid electrolyte capacitor comprising a solid electrolyte capacitor body having at least one electrical contact region on a surface thereof; a conductive resin layer that is rendered conductive by having a matrix of conducting particles dispersed therein, said resin layer overlying said contact region; and a layer consisting of distinct solderable metal particles which is directly bound by and only partially embedded in the outer surface of said resin layer.

2. The termination system of claim 1 wherein said metal particles have diameters of from 0.0005 to 0.01 inch.

3. The termination system of claim 1 wherein said metal particle layer has a thickness from 1 to 10 times the average diameter of said metal particles.

4. The termination system of claim 1 wherein said conductive particles of said matrix is selected from silver, copper, nickel and alloys thereof.

5. The termination system of claim 1 wherein said solderable metal particles are selected from copper, nickel, tin, lead, silver and alloys thereof.

6. The termination system of claim 1 wherein said resin is an epoxy resin.

7. The termination system of claim 1 wherein said contact region consists of carbon particles that overlie the solid electrolyte of said capacitor body.

8. The termination system of claim 1 wherein said contact region consists of a silver layer being bonded to an underlying layer of carbon particles that is in turn bonded to the solid electrolyte of said capacitor.

9. The termination system of claim 8 wherein said solid electrolyte has a rough outer surface and wherein said graphite and silver layers are thin layers that are conformal to said rough surface causing said contact region to have a similarly rough outer surface, said overlying resin layer being mechanically keyed into said rough contact surface to provide a strong mechanical bond between said resin layer and said solid electrolyte.

10. The termination system of claim 1 wherein said contact region consists of a valve metal which is the anode of said capacitor.

11. The termination system of claim 1 additionally comprising an outer solder layer that is solder bonded to said layer of metal particles.

12. In a solid electrolyte capacitor of the kind having a porous valve metal pad sinter-bonded to one surface of a substrate, which surface is of said valve metal, and including an oxide film grown over said valve metal, a solid electrolyte layer overlying said film, and a layer of graphite covering said solid electrolyte at a region thereof that overlies the surface of said pad remotest from said substrate, the improvement comprising: a conductive resin layer that is rendered conductive by having a matrix of conductive particles dispersed therein, said resin layer overlying said graphite layer; and a layer consisting of distinct solderable particles which is directly bound by and only partially embedded in the outer surface of said conductive resin layer.

13. The capacitor of claim 12 additionally comprising a silver layer being interposed between said solid electrolyte and said conductive resin.

14. The capacitor of claim 13 wherein said solid electrolyte has a rough outer surface and wherein said graphite and silver layers are thin layers that are conformal to said rough surface, said overlying resin layer being mechanically keyed into said rough surface to provide a strong mechanical bond between said resin layer and said solid electrolyte.

15. The capacitor of claim 13 wherein said substrate is flat and additionally comprising a conductive resin tower which is attached to said substrate surface, the remotest surface of said tower having an elevation relative to said substrate surface that is about equal to that of said graphite layer, said tower being spaced from said pad, a layer of distinct solderable particles only partially embedded in said tower surface in order to provide strong highly solderable anode and cathode terminations that lie essentially in the same plane.

16. The capacitor of claim 15 additionally comprising an insulative resin substantially filling the space between said tower and said pad.

17. The capacitor of claim 13 additionally comprising another conductive resin layer being bonded to a surface of said substrate opposite to said one surface, another layer of distinct solderable particles being directly bound by and only partially embedded in the outer surface of said conductive resin layer.

18. The capacitor of claim 13 additionally comprising a solderable metal strip being welded to said one surface of said substrate.

19. A method for making a solderable termination on a contact region of a solid electrolyte capacitor body, comprising applying a liquid layer of a conductive resin to said contact region, depositing solderable metal particles into the wet outer surface of said resin and subsequently curing said resin.

20. The method of claim 19 wherein said applying is accomplished by pouring said solderable particles onto said liquid resin.

21. The method of claim 19 wherein said applying is accomplished by dipping said body with said liquid layer into a fluidized bed of said particles.

22. The method of claim 19 additionally comprising removing the excess of said particles that are not strongly adhered to said liquid resin prior to said curing.

23. The method of claim 22 wherein said removing is accomplished by shaking said body.

24. The method of claim 22 wherein said removing is accomplished by directing a blast of air at said particles.

25. The method of claim 22 wherein said removing is accomplished by brushing said particles.

26. The capacitor of claim 12 additionally comprising an insulative resin being adjacent to and encircling said pad, the remotest surface of said resin having an elevation relative to said substrate surface that is about equal to that of said graphite layer.

27. A method for making a plurality of solid electrolyte capacitors including screen printing pads of a valve-metal-powder-containing ink in rows and columns on a substrate of said valve metal, heating to sinter in each said ink pad the particles of said powder to each other and to said substrate and to transform said ink pads into porous pads of said valve metal, forming a valve-metal oxide film over the surfaces of said porous pads, and applying successively a solid electrolyte and a graphite layer over each of said pads wherein the improvement comprises applying a liquid layer of a conductive resin over said graphite layer; depositing solderable metal particles into the wet outer surface of said resin; curing said conductive resin; flooding the streets, which separate said rows and said columns, with an insulating resin; curing said insulating resin; and severing said substrate to separate said pads.

* * * * *